US010884154B2

(12) United States Patent
Li et al.

(10) Patent No.: US 10,884,154 B2
(45) Date of Patent: Jan. 5, 2021

(54) MONITORING AND FOREWARNING METHOD FOR COAL-ROCK DYNAMIC DISASTERS BASED ON ELECTROMAGNETIC RADIATION AND EARTH SOUND

(71) Applicants: University of Science and Technology Beijing, Beijing (CN); Zhong-an Academy of safety Engineering, Beijing (CN)

(72) Inventors: Zhenlei Li, Beijing (CN); Xueqiu He, Beijing (CN); Dazhao Song, Beijing (CN); Shengquan He, Beijing (CN); Donghui Li, Beijing (CN)

(73) Assignees: UNIVERSITY OF SCIENCE AND TECHNOLOGY BEIJING, Beijing (CN); ZHONG-AN ACADEMY OF SAFETY ENGINEERING, Beijing (CN)

( * ) Notice: Subject to any disclaimer, the term of this patent is extended or adjusted under 35 U.S.C. 154(b) by 5 days.

(21) Appl. No.: 16/343,407

(22) PCT Filed: Mar. 30, 2018

(86) PCT No.: PCT/CN2018/081210
§ 371 (c)(1),
(2) Date: Apr. 19, 2019

(87) PCT Pub. No.: WO2019/161593
PCT Pub. Date: Aug. 29, 2019

(65) Prior Publication Data
US 2020/0033496 A1    Jan. 30, 2020

(30) Foreign Application Priority Data

Feb. 26, 2018 (CN) .......................... 2018 1 0162579

(51) Int. Cl.
*G01V 3/12* (2006.01)
*E21F 17/18* (2006.01)
(Continued)

(52) U.S. Cl.
CPC .............. *G01V 3/12* (2013.01); *E21F 17/185* (2013.01); *G01L 5/0004* (2013.01); *G01N 27/725* (2013.01)

(58) Field of Classification Search
CPC ......... G01V 3/12; G01V 11/00; E21F 17/185; E21F 17/18; G01L 5/0004; G01L 1/146; G01N 27/725; G08B 21/10
See application file for complete search history.

(56) References Cited

U.S. PATENT DOCUMENTS

| 8,706,654 | B2 * | 4/2014 | Bertogg | G06Q 40/08 706/12 |
| 2015/0281881 | A1 * | 10/2015 | Appleby | F42D 3/00 715/848 |
| 2019/0257972 | A1 * | 8/2019 | Palmer | E21B 49/003 |

FOREIGN PATENT DOCUMENTS

| AU | 2006309259 A1 | 5/2007 |
| CN | 101021570 A | 8/2007 |

(Continued)

*Primary Examiner* — Akm Zakaria
(74) *Attorney, Agent, or Firm* — Bayramoglu Law Offices LLC

(57) ABSTRACT

A monitoring and forewarning method for coal-rock dynamic disasters based on an electromagnetic radiation and an earth-sound monitoring includes the following steps: (1) calculating the weighted average value of research parameter P(t) during a time period according to the monitoring data collected by the electromagnetic radiation and the earth-sound monitoring system in real time; (2) calculating D(t), the deviation value of P(t); (3) calculating $\overline{|D(t)|}$ as the deviation threshold value, the average value of |D(t)| during period of normal mining of the working surface; (4) calcu- (Continued)

lating $D_S$, the number of times that $D(t)$ is greater than $\overline{|D(t)|}$ in one day; (5) normalizing $D_S$ to obtain the monitoring and forewarning index $\varepsilon$; (6) forewarning the hazard state of dynamic disaster of the working surface in real time according to $\varepsilon$ and forewarning method, determining hazard level.

6 Claims, 3 Drawing Sheets

(51) Int. Cl.
*G01L 5/00* (2006.01)
*G01N 27/72* (2006.01)

(56) References Cited

FOREIGN PATENT DOCUMENTS

| CN | 102102533 A | * | 6/2011 | ............... G01V 3/12 |
|----|-------------|---|--------|---------------------------|
| CN | 105257339 A |   | 1/2016 |                           |
| CN | 105484802 A |   | 4/2016 |                           |
| CN | 106437854 A |   | 2/2017 |                           |
| GB | 2402745 A   |   | 12/2004|                           |

\* cited by examiner

MONITORING AND FOREWARNING METHOD FOR COAL-ROCK DYNAMIC DISASTERS BASED ON ELECTROMAGNETIC RADIATION AND EARTH SOUND

CROSS REFERENCE TO THE RELATED APPLICATIONS

This application is the national phase entry of International Application No. PCT/CN2018/081210, filed on Mar. 30, 2018, which is based upon and claims priority to Chinese Patent Application No. 201810162579.X, filed on Feb. 26, 2018, the entire contents of which are incorporated herein by reference.

TECHNICAL FIELD

The present invention relates to a forewarning method and a monitoring criterion for a hazard of a coal-rock dynamic disaster, particularly to a monitoring and forewarning method for coal-rock dynamic disasters by an electromagnetic radiation and an earth sound, which is mainly used for a real-time monitoring and a quantitative forewarning for dynamic disasters such as coal mine pressure bump and coal-gas outburst.

BACKGROUND

Coal-rock dynamic disasters mainly include pressure bump, coal-gas outburst and so on. The coal-rock dynamic disasters always occur in a high stress concentration region under a mining action, which can cause huge damages including mine tunnel damages, casualties and device failures. Due to the long-term mining of the coal resources, shallow resources are gradually exhausted. In China, deep mining is generally becoming dominant, resulting in a rising trend in the frequency, strength and destructiveness of the dynamic disasters. Therefore, accurate and efficient monitoring and forewarning is the precondition and guarantee for taking precautionary measures and ensuring safety production of coal mine.

At present, the monitoring and forewarning methods for coal-rock dynamic disasters mainly include drilling cuttings monitoring, electromagnetic radiation monitoring, earth-sound monitoring, coal stress monitoring and micro-seismic monitoring. The drilling cuttings monitoring has the disadvantages of huge work quantities, high prices, small monitoring range, and limited quantity of obtained information, and currently, the drilling cuttings monitoring has generally become an auxiliary monitoring tool. The electromagnetic radiation monitoring can be used to monitor the stress concentration, micro-fracture and macro-fracture of the coal rock, and the monitoring parameters thereof are energy and pulse. The electromagnetic radiation monitoring has limited forewarning effect. The earth-sound monitoring is mainly used to monitor the high-frequency and low-energy micro-fracture during the initial development of dynamic disaster, the monitoring parameters thereof are energy and frequency. The forewarning effect of the earth-sound monitoring needs to be improved. Coal stress monitoring is a kind of point monitoring with a small monitoring range, and the forewarning effect thereof is not good in the condition of poor coupling between borehole stress gauge and coal borehole. The micro-seismic monitoring can be used for the time series monitoring of coal-rock fractures and the space positioning of fracture sources, and the monitoring range thereof is large. However, the micro-seismic monitoring is usually used to monitor the low-frequency and high-energy macro-fractures, and it is difficult to capture the micro-fractures during the initial development of dynamic disasters.

The electromagnetic radiation and earth-sound monitoring has huge data quantity, is very sensitive to the micro-fractures, and is capable of reflecting a large amount of detailed information. Therefore, the electromagnetic radiation and earth-sound monitoring is an ideal monitoring and forewarning means of dynamic disasters. However, due to the lack of in-depth research on the electromagnetic radiation and the earth-sound precursory parameters, the original statistical parameters such as energy, pulse number, frequency, etc., are simply used for monitoring and forewarning, causing extensive false alarms and omissions, which has affected the mine safety production. Therefore, through the in-depth analysis of the electromagnetic radiation and the earth-sound precursory parameters, it is necessary to propose a novel forewarning criterion and forewarning method for coal-rock dynamic disasters based on an electromagnetic radiation and an earth-sound monitoring, so as to achieve the purpose of improving the reliability of the monitoring and forewarning for coal-rock dynamic disaster.

In view of the above problems, the present invention provides a forewarning criterion and forewarning method for coal-rock dynamic disasters based on an electromagnetic radiation and an earth-sound monitoring, so as to realize a real-time monitoring of a developing process of a coal-rock dynamic disaster and a reliable forewarning of the dynamic disaster.

SUMMARY

In order to achieve the above-mentioned objective, the technical solution of the present invention is as follows. A monitoring and forewarning method for coal-rock dynamic disasters based on an electromagnetic radiation and an earth-sound monitoring is provided. For the method, an electromagnetic radiation sensor and an earth-sound sensor are respectively arranged on a coal body or a rock body for collecting an energy and a pulse number of the electromagnetic radiation, and an energy and a frequency of an earth-sound signal in real time as original data. The method includes the following steps specifically:

step (1), calculating P(t), wherein the P(t) is a weighted average value of a research parameter in a time period, and the P(t) is calculated according to monitoring data collected by an electromagnetic radiation and earth-sound monitoring system;

step (2), calculating D(t), wherein the D(t) is a deviation value of P(t);

step (3), calculating $\overline{|D(t)|}$, and using the $\overline{|D(t)|}$ as a deviation threshold value, wherein the $\overline{|D(t)|}$ is an average value of an absolute value of D(t) during a period of normal mining of a working surface;

step (4), counting $D_S$, wherein the $D_S$ is a number of times that the D(t) is greater than the deviation threshold value $\overline{|D(t)|}$ in one day;

step (5), normalizing the $D_S$ to obtain a monitoring and forewarning index ε;

step (6), forewarning a hazardous state of a dynamic disaster of the working surface in real time according to the monitoring and forewarning index ε and a forewarning method, and determining a hazard level of the dynamic disaster.

Preferably, in the step (1), the research parameter is one or more of an electromagnetic radiation energy, an electromagnetic radiation pulse number, an earth-sound energy, or an earth-sound frequency; and the weighted average value of the research parameter P(t) is defined as a result of a cumulative sum of the research parameter divided by a time window length in a period.

Preferably, the period is set as 10 minutes.

Preferably, in the step (2), the deviation value D(t) is calculated by the following formula:

$$D(t) = \frac{P(t) - \overline{P(T_t)}}{\overline{P(T_t)}};$$

where, $$\overline{P(T_t)} = \frac{1}{n}\sum_{i=1}^{n} P_i(T_t), T_t$$

represents a time interval related to time t, and is the time interval from a time point before the time t to the time t, and n is a number of the P(t) in the time interval $T_t$.

Preferably, the time interval is set as 24 hours.

Preferably, in the step (3), the period of normal mining refers to a period in which the working surface is not affected by geological structures including faults and folds and there is no abnormal situation including roof weighting and dynamic pressure behavior.

Preferably, in the step (5), the monitoring and forewarning index ε is calculated by the following formula:

$$\varepsilon = \frac{D_S - D_{S\text{-}min}}{D_{S\text{-}max} - D_{S\text{-}min}},$$

where, $D_{S\text{-}max}$ is a maximum value of the $D_S$ in a period, and $D_{S\text{-}min}$ is a minimum value of the $D_S$ during the period.

Preferably, the period is a time period from a time point in which a previous dynamic pressure behavior occurs to the present time point.

Preferably, in the step (6), the hazard level includes no hazard, low hazard, medium hazard and high hazard, and the hazard level is determined as follows. when ε<0.5, the no hazard exists, when 0.5≤ε<0.65, low hazard exists, when 0.65≤ε<0.8, medium hazard exists, and when 0.8≤ε, high hazard exists.

Compared with the prior art, the present invention has the following advantages:

According to the monitoring and forewarning method of coal-rock dynamic disasters based on the electromagnetic radiation and earth-sound monitoring of the present invention, through analyzing the original data monitored by the electromagnetic radiation and earth-sound monitoring device in depth, the deviation value and the deviation threshold value of the weighted average value of research parameter during a predetermined time window are calculated, and the times $D_S$ that the deviation value of the research parameter is greater than the deviation threshold in a day is obtained. The $D_S$ is normalized to obtain a new parameter ε as the monitoring and forewarning index, and finally the hazard state of the coal-rock dynamic disaster in the monitoring range is determined in real time via the real-time value of ε. The forewarning index and forewarning method have significant and unequivocal physical meaning, and are easy to be programed. A real-time and quantitative forewarning of the hazard of dynamic disaster can be realized, having a positive effect on mine safety production.

DETAILED DESCRIPTION

Figure 1:
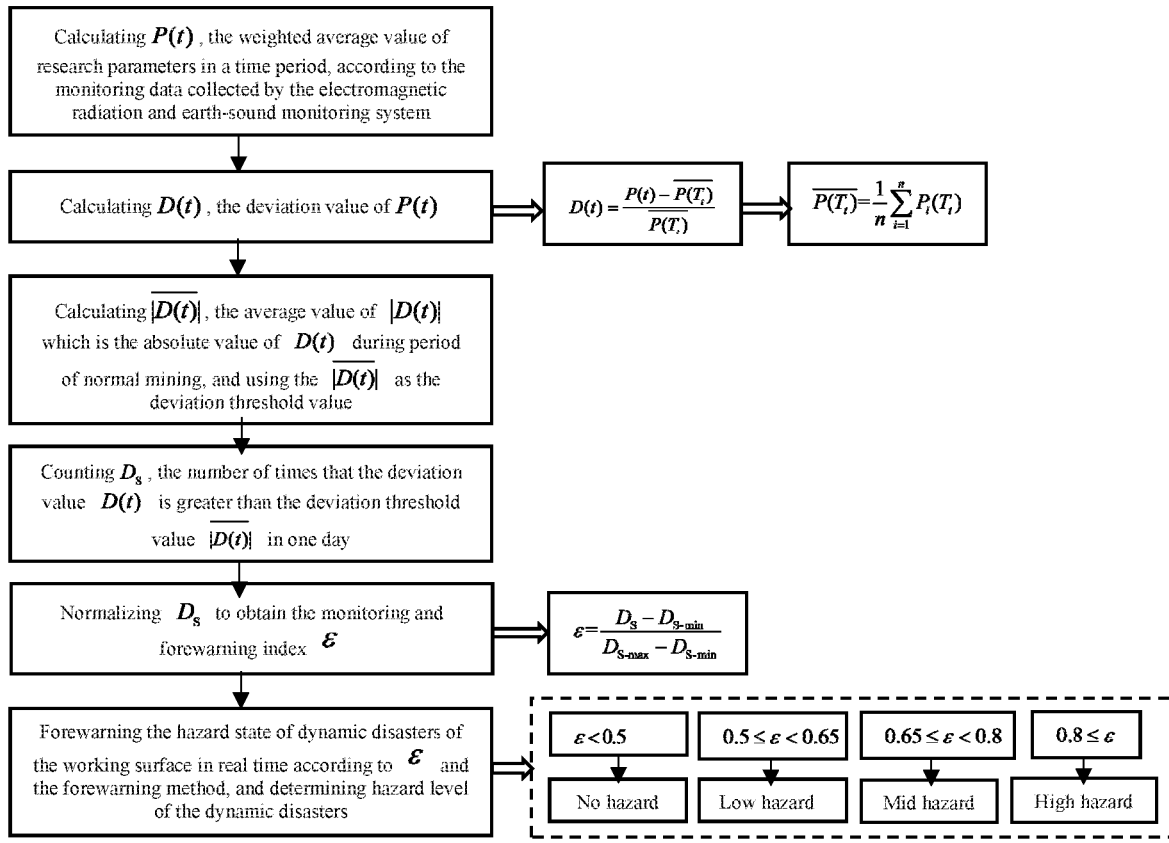
FIG. 1 is a flowchart of the present invention.

The technical solution in the embodiment of the present invention will be described clearly and definitely with reference to the accompanying drawings of the embodiments of the present invention. Apparently, the described embodiments are merely a part of embodiments of the present invention, rather than all embodiments. All other embodiments made by those skilled in the art without creative work belong to the protective scope of the present invention.

Referring to FIG. 1-FIG. 5, the technical solution of the present invention is as follows. A monitoring and forewarning method for coal-rock dynamic disasters based on an electromagnetic radiation and an earth-sound monitoring is provided. For the method, an electromagnetic radiation sensor and an earth-sound sensor are respectively arranged on a coal body or a rock body for collecting an energy and a pulse number of the electromagnetic radiation, and an energy and a frequency of an earth-sound signal in real time as original data. The method includes the following steps:

step (1), P(t), the weighted average value of research parameter in a time period, is calculated according to the monitoring data collected in real time by the electromagnetic radiation and earth-sound monitoring system. The research parameter is one or more of the electromagnetic radiation energy, the electromagnetic radiation pulse number, the earth-sound energy, or the earth-sound frequency; and the weighted average value of the research parameter P(t) is defined as the result of the cumulative sum of research parameter divided by the time window length during the time period, for example, the time period may be 10 minutes.

step (2), D(t), the deviation value of P(t), is calculated. The deviation value D(t) is calculated by the following formula:

$$D(t) = \frac{P(t) - \overline{P(T_t)}}{\overline{P(T_t)}};$$

where, $$\overline{P(T_t)} = \frac{1}{n}\sum_{i=1}^{n} P_i(T_t), \quad T_t$$

represents the time interval related to the time t, and is the time interval from a time point before the time t to the time t, and n is the number of P(t) in the time interval $T_t$.

step (3), $\overline{|D(t)|}$, the average value of $\overline{|D(t)|}$ which is the absolute value of D(t) during the period of normal mining of the working surface, is calculated, and the $\overline{|D(t)|}$ is used as the deviation threshold value. The period of normal mining refers to the period in which the working surface is not affected by geological structures including faults and folds and there is no abnormal situation including roof weighting and dynamic pressure behavior. The period of normal mining may be one or multiple months.

step (4), $D_S$, the number of times that the deviation value D(t) is greater than the deviation threshold value $\overline{|D(t)|}$ in one day, is calculated.

step (5), $D_S$ is normalized to obtain the monitoring and forewarning index ε. The monitoring and forewarning index ε is calculated by the following formula:

$$\varepsilon = \frac{D_S - D_{S\text{-}min}}{D_{S\text{-}max} - D_{S\text{-}min}},$$

where, $D_{S\text{-}max}$ is d the maximum value of $D_S$ during a time period (generally, the time period is a period from a time point when the dynamic pressure behavior occurs to the present time point), and $D_{S\text{-}min}$ is the minimum value of $D_S$ during the time period (generally, the time period is a period from a time point when the dynamic pressure behavior occurs to the present time point).

step (6), according to the monitoring and forewarning index and the forewarning method, the hazard state of dynamic disaster of the working surface is forewarned in real time, and the hazard level of the dynamic disaster is determined. The hazard level includes no hazard, low hazard, medium hazard and high hazard. The hazard level is determined as follows. When ε<0.5, no hazard exists, when 0.5≤ε<0.65, low hazard exists, when 0.65≤ε<0.8, medium hazard exists, and when 0.8≤ε high hazard exists.

One embodiment of the present invention is further described below with reference to drawings.

In the present embodiment, the earth-sound energies collected from Aug. 8, 2016 to Jan. 25, 2017 by the earth-sound monitoring system within the hazardous working surface under the mine pressure bump are used as the initial data. The initial data is processed and analyzed by the method of the present invention to obtain the monitoring and forewarning index of the present invention. The forewarning method is used to determine the hazard state of the working face, thus explaining the implement of the present invention.

Figure 2:
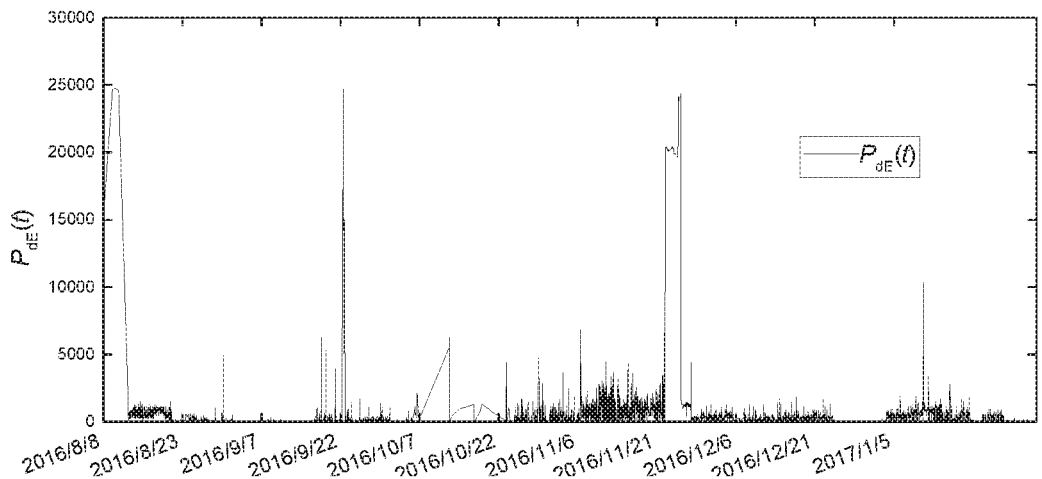
FIG. 2 is a weighted average value $P_{dE}$(t) during a time period calculated by an earth-sound energy in accordance with one embodiment of the present invention.

The earth-sound energy is taken as a research parameter. Each time interval of 10 minutes, $P_{dE}(t)$, the weighted average value of the earth-sound energy, is calculated, and the results are shown in FIG. 2.

Figure 3:
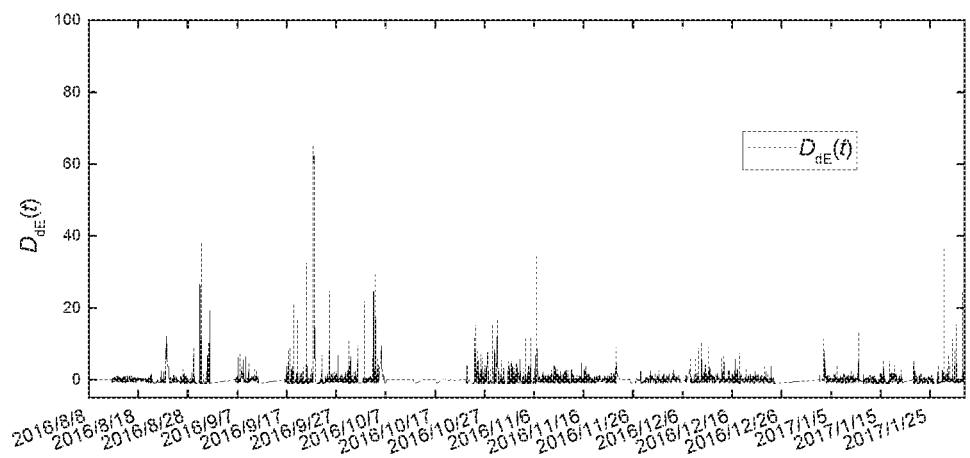
FIG. 3 is a deviation value $D_{dE}$(t) calculated by an earth-sound energy in accordance with one embodiment of the present invention.

The $D_{dE}(t)$, the deviation value of $P_{dE}(t)$, is calculated based on the following formula:

$$D_{dE}(t) = \frac{P_{dE}(t) - \overline{P_{dE}(T_t)}}{\overline{P_{dE}(T_t)}},$$

where $$\overline{P_{dE}(T_t)} = \frac{1}{n}\sum_{i=1}^{n} P_{dE\text{-}i}(T_t), \quad T_t$$

represents the time interval, and the time interval is 24 hours, n is the number of the weighted average value of the earth-sound energy within the time interval of $T_t$. The results of $D_{dE}(t)$ calculated based on the results in FIG. 2 are shown in FIG. 3.

$\overline{|D_{dE}(t)|}$, the average value of absolute values of deviation values collected during the mining period without abnormal situation on working surface (from Aug. 8, 2016 to Sep. 8, 2016), is calculated. The result of $\overline{|D_{dE}(t)|}$ is 0.62, which is used as the deviation threshold value.

Figure 4:
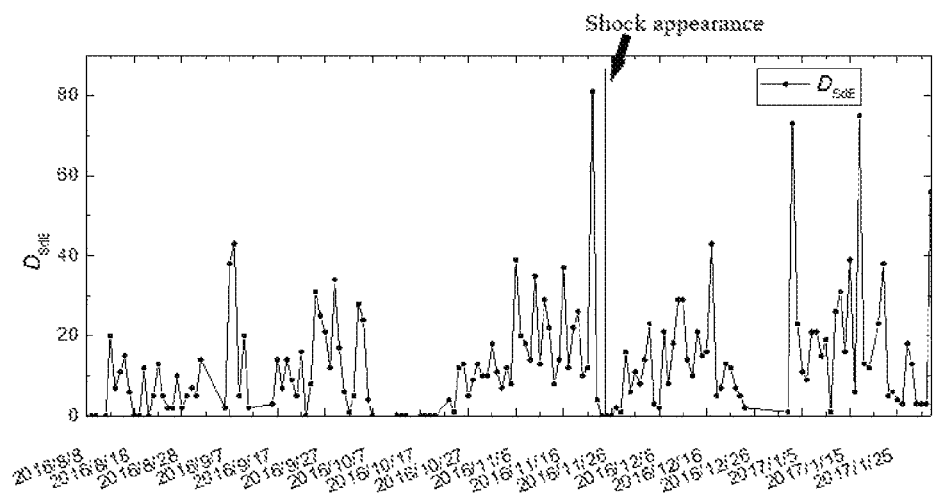
FIG. 4 is a number of times $D_{SdE}$ that a deviation value calculated by an earth-sound energy is greater than a deviation threshold value in one day in accordance with one embodiment of the present invention.

$D_{SdE}$, the number of times that the deviation value $\overline{|D_{dE}(t)|}$ is greater than the deviation threshold value $\overline{|D_{dE}(t)|}$ in a day, is calculated, and the results are shown in FIG. 4.

Figure 5:
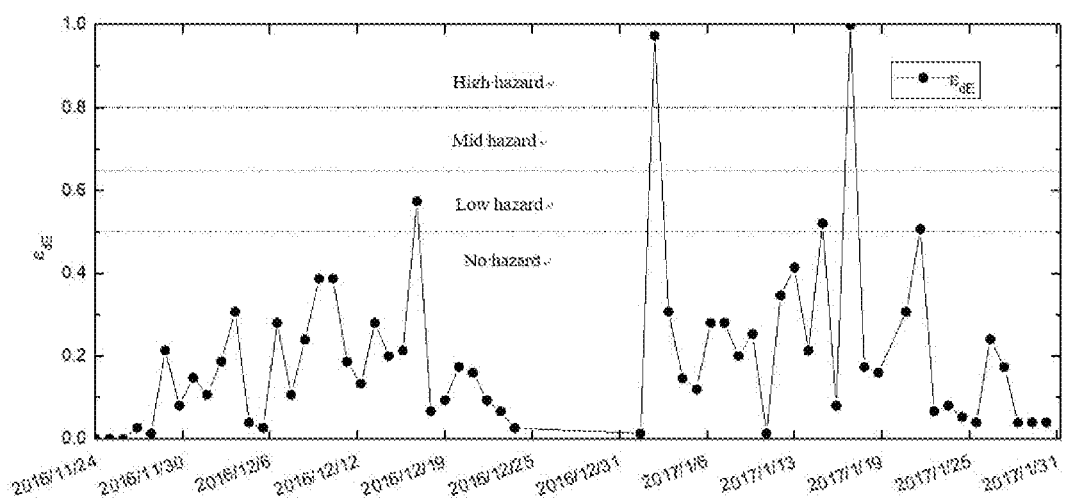
FIG. 5 is a normalized monitoring and forewarning index ε calculated by an earth-sound energy in accordance with one embodiment of the present invention.

A time window after Nov. 24, 2016 (the day when a coal burst occurs) from FIG. 4 is selected to be normalized. The monitoring and forewarning index $\varepsilon_{dE}$ is calculated through the formula $$\varepsilon_{dE} = \frac{D_{SdE} - D_{SdE\text{-}min}}{D_{SdE\text{-}max} - D_{SdE\text{-}min}},$$

and the calculation results are shown in FIG. 5.

Finally, the hazard level is determined according to the monitoring and forewarning index $\varepsilon_{dE}$ and the determination criteria of bursting hazard. When ε<0.5, no hazard exists, when 0.5≤ε<0.65, low hazard exists, when 0.65≤ε<0.8, medium hazard exists, and when 0.8≤ε, high hazard exists. The hazard level of the coal working surface between Nov. 24, 2016 and Jan. 25, 2017 is shown in FIG. 5.

Although preferred embodiments of the present invention have been described in detail, it should be understood by those skilled in the art that various changes, modifications and substitutions can be made to the embodiments without departing from the principle and spirit of the present invention, the scope of the present invention is defined by the appended claims and the equivalents thereof.

What is claimed is:

1. A monitoring and forewarning method for coal-rock dynamic disasters based on an electromagnetic radiation and an earth sound, wherein an electromagnetic radiation sensor and an earth-sound sensor are respectively arranged on a coal body or a rock body for collecting an energy and a pulse number of the electromagnetic radiation, and an energy and a frequency of an earth-sound signal in real time as original data; the method comprises the following steps:

step (1), calculating P(t), wherein the P(t) is a weighted average value of a research parameter in a time period, and the P(t) is calculated according to monitoring data collected by an electromagnetic radiation and an earth-sound monitoring system;

step (2), calculating D(t), wherein the D(t) is a deviation value of the P(t);

step (3), calculating $\overline{|D(t)|}$, wherein the $\overline{|D(t)|}$ is an average value of the |D(t)|, and the |D(t)| is an absolute value of the D(t) during a period of normal mining of a working surface, and using the $\overline{|D(t)|}$ as a deviation threshold value;

step (4), calculating $D_S$, wherein the $D_S$ is a number of times that the deviation value D(t) is greater than the deviation threshold value $\overline{|D(t)|}$ in one day;

step (5), normalizing the $D_S$ to obtain a monitoring and forewarning index ε;

step (6), forewarning a hazard state of a dynamic disaster of the working surface in real time according to the ε and a forewarning method, and determining a hazard level of the dynamic disaster, wherein, in the step (1), the research parameter is one or more of an electromagnetic radiation energy, an electromagnetic radiation pulse number, an earth-sound energy, or an earth-sound frequency, and the weighted average value of the research parameter P(t) is a result of a cumulative sum of the research parameter divided by a time window length during the time period, the monitoring and forewarning index ε in the step (5) is calculated by the following formula:

$$\varepsilon = \frac{D_S - D_{S\text{-}min}}{D_{S\text{-}max} - D_{S\text{-}min}},$$

wherein $D_{S\text{-}max}$ is a maximum value of the $D_S$ during the time period, and $D_{S\text{-}min}$ is a minimum value of the $D_S$ during the time period, and the hazard level in the step (6) includes no hazard, a low hazard, a medium hazard and a high hazard; and the hazard level is determined as follows: when ε<0.5, no hazard exists, when 0.5≤ε<0.65, the low hazard exists, when 0.65≤ε<0.8, the medium hazard exists, and when 0.8≤ε, the high hazard exists.

2. The monitoring and forewarning method of claim 1, wherein, the time period is 10 minutes.

3. The monitoring and forewarning method of claim 1, wherein, the deviation value D(t) in the step (2) is calculated by the following formula:

$$D(t) = \frac{P(t) - \overline{P(T_t)}}{P(T_t)};$$

wherein, $$\overline{P(T_t)} = \frac{1}{n}\sum_{i=1}^{n} P_i(T_t), T_t$$

represents a time interval related to time t, and is the time interval from a time point before the time t to the time t, and n is a number of the P(t), the weighted average value of the research parameter, in the time interval of $T_t$.

4. The monitoring and forewarning method of claim 3, wherein, the time interval is 24 hours.

5. The monitoring and forewarning method of claim 1, wherein, the period of normal mining of the working surface in the step (3) is a period in which the working surface is not affected by geological structures including faults and folds and there is no abnormal situation in the working surface including a roof weighting and a dynamic pressure behavior, and the period is one or multiple months.

6. The monitoring and forewarning method of claim 1, wherein, the time period is from a time point that a previous dynamic pressure behavior occurs to a present time point.

* * * * *